Patented Sept. 25, 1951

2,568,902

UNITED STATES PATENT OFFICE 2,568,902

BETA THIOETHYL SUBSTITUTED CARBONYL COMPOUNDS AS MODIFIERS IN ETHYLENE POLYMERIZATION

Ralph B. Thompson and Louis Schmerling, Riverside, Ill., assignors to Universal Oil Products Company, Chicago, Ill., a corporation of Delaware No Drawing. Application March 30, 1948, Serial No. 18,074

8 Claims. (Cl. 260—94.9)

This invention relates to the production of ethylene polymers. It is more specifically concerned with the catalytic polymerization of ethylene in the presence of an organic peroxide, a diluent, and an organic compound containing a (beta-thioethyl) carbonyl group.

The peroxide catalyzed polymerization of ethylene is assuming growing importance due to the increasing utilization of the products thereby produced. Many of the polymerization processes of this type use a diluent such as an alcohol, an aromatic hydrocarbon, or a saturated hydrocarbon containing at least 3 carbon atoms per molecule. When saturated hydrocarbon diluents are employed at low to moderate pressures, i. e., not exceeding several hundred atmospheres, the polymer produced is quite soft, and has a relatively low melting point and possesses a grease-like consistency. When other diluents are used, under similar conditions, the polymer produced is of wax-like consistency. We have now found that when an organic compound containing a (beta-thioethyl) carbonyl group is used in conjunction with such diluents the melting point of the polymer is increased considerably and the consistency of the product changes from that of a grease-like petrolatum to that of a wax or from a wax to a harder wax. In addition, the presence of the organic compound containing a (beta-thioethyl) carbonyl group frequently increases the yield.

In one embodiment our invention relates to a polymerization process which comprises subjecting ethylene to the action of an organic peroxide polymerization catalyst at polymerizing conditions in the presence of a diluent and an organic compound containing a (beta-thioethyl) carbonyl group.

In a more specific embodiment our invention relates to a polymerization process which comprises subjecting ethylene to the action of an organic peroxide polymerization catalyst at a superatmospheric pressure and a temperature at least as high as the decomposition temperature of said catalyst and in the presence of a diluent and an organic compound containing a (beta-thioethyl) carbonyl group.

The ethylene charged to our process may be obtained from any source, such as the oxidative cracking of ethane, the dehydrogenation of ethane, the dehydration of ethyl alcohol, and particularly the thermal and catalytic cracking and reforming of higher boiling hydrocarbons. Many of the known processes for polymerizing ethylene require a highly purified charge stock, i. e., the ethylene has to be substantially free from other hydrocarbons and from dissolved oxygen. In contrast, the yield and quality of the polymerization product in our process are substantially unaffected by the presence of other hydrocarbons, such as ethane, or by the presence of dissolved oxygen. Thus an ethane-ethylene fraction may be charged to the process of this invention together with a suitable organic peroxide polymerization catalyst, a diluent, and an organic compound containing a (beta-thioethyl) carbonyl group. The olefin is converted to a polymer thereof in good yields and the ethane in the product is simply and inexpensively separated from the polymers. There is no need for a costly charge stock purification step.

The diluents that may be used in the present process include alcohols, such as tertiary butyl alcohol; aromatic hydrocarbons such as benzene, toluene, ethylbenzene and xylenes; and saturated hydrocarbons containing 3 or more carbon atoms per molecule, such as normal butane, isobutane, cyclohexane, and methylcyclohexane.

Catalysts which may be used in the present process comprise those organic peroxides which catalyze the polymerization of ethylene. These substances include peracetic acid, diacetyl peroxide, toluic acid peroxide, oleic peroxide, benzoyl peroxide, tertiary butyl perbenzoate, ditertiarybutyl peroxide, hexyl peroxide, tertiarybutyl hydroperoxide, and methylcyclohexylhydroperoxide.

The additives that may be used in the present process consist of organic compounds containing a (beta-thioethyl) carbonyl group, which may be represented as

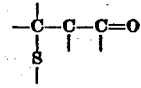

wherein the indicated unsatisfied valences are satisfied by hydrogen or organic radicals. Compounds of this type include organic compounds containing a bis (beta-thioethyl) ketone group in which at least one of the substituents on said group is a hydrocarbon radical, preferably an alkyl radical; and an organic compound containing a (beta-thioethyl) carbonyl group in which at least one of the substituents in said group is a hydrocarbon radical, preferably an alkyl radical. Examples of such compounds are bis(beta, beta-dimethyl-beta-ethylthioethyl) ketone, or as it may be called, 2,6-dimethyl-2,6-bis-ethylthioheptanone - 4; beta - phenyl-beta-n-propylthioethyl phenyl ketone; 2-methyl-2-p-tolylthiopentanone - 4; 2 - ethylthio-4-keto-2,6-dimethylheptene-5, 2-methyl-2 p-methylaminophenylthiopentanone-4; lauryl thiodipropionate; 2,6-dimethyl - 2,6-bis-p-hydroxyphenylthiopentanone-4; 2,6 - dimethyl-2,6-bis(carboxymethylthio) heptanone - 4; alpha - (ethylthiomethyl) - succinic acid; 5,8-dithiadodecane dione-2,11; 2,6-bis(1-ethylthiobenzyl) - cyclohexanone; 4,7-dithia-1,3,8,10 - tetraphenyldeconedione - 1,10; beta, beta-bis(2,3 - dihydroxypropylthio) dibenzyl acetone; beta-ethylthiobenzylacetone; bis - (γ-ketobutyl) sulfide; beta - n-propylthiobenzylacetophenone; and methyl beta-isopropylthiapropionate.

The process of our invention may be carried out in batch operation by placing a quantity of the diluent, the organic compound containing a (beta-thioethyl) carbonyl group, and a catalyst in a reactor equipped with a mixing device, adding the ethylene, heating to a reaction temperature while mixing the contents of the reactor, cooling after a suitable period of time and recovering the polymer. The preferred method of operation is of the continuous type. In this method of operation the ethylene, diluent, organic compound containing a (beta-thioethyl) carbonyl group, and catalyst are continuously charged to a reactor maintained under suitable conditions of temperature and pressure. The reactor may be an unpacked vessel or coil or it may contain an adsorbent packing material, such as fire brick, alumina, dehydrated bauxite, and the like. The polymer is separated from the reactor effluent, usually by fractionation. The diluent and unconverted ethylene may be recycled to the reaction zone.

Another mode of operation that may be used comprises the fluidized type wherein the charge is passed upwardly through a bed of finely divided adsorbent material, thereby causing the particles to become motionalized and forming a fluid-like mass. A portion of the adsorbent material may be continuously withdrawn from the reaction zone, cooled, and returned thereto, thus providing an efficient method of removing the heat of reaction.

Instead of separately adding the peroxide catalyst to the reaction zone, we have found that it frequently is desirable and economical to form the catalyst in situ in the diluent, when said diluent is a hydrocarbon, and then to charge the resulting solution to the reaction zone together with the ethylene and the organic compound containing the specified group. Formation of the peroxide in the hydrocarbon diluent may be accomplished by autooxidation, i. e., by heating the hydrocarbon while air is bubbled through it, preferably in the presence of a trace of peroxide formed in a previous autooxidation. Alternatively, the air may be passed through the hydrocarbon in the presence of an oxidation catalyst such as manganese stearate. In some cases it will be beneficial to add a minor amount of an olefinic or a cycloolefinic hydrocarbon to the diluent before passing air through it.

In the continuous methods of carrying out our process, the catalyst is added continuously to the reaction zone, but, if desired, it may be added intermittently, particularly when a packing material which tends to retain catalyst is employed in the reactor.

The temperature employed in the process of this invention should be at least as high as the initial decomposition temperature of the peroxide used as the catalyst. In the case of tertiarybutyl perbenzoate, for example, the decomposition temperature is approximately 115° C. Higher temperatures may be employed, but ordinarily little advantage is gained if the temperature is more than 150° C. higher than the decomposition temperature of the catalyst.

In contrast to many of the prior art processes, pressures as low as 15 atmospheres and lower may be employed with good results in our process. On the other hand, pressures as high as 500 atmospheres or greater may be used. In general, the molecular weight of the polymer increases with increasing pressure.

The concentration of catalyst utilizable in our process can vary over a wide range. For reasons of economy, it generally is advisable to use low concentrations of catalyst such as from about 0.1% to 4% of the ethylene charged. Higher concentrations of catalyst usually results in lower molecular weight products.

In batch operation and flow operations that do not employ packing materials, the contact time ordinarily will be in the range of from about 3 minutes to about 6 hours. Contact times of at least 10 minutes usually are preferred. In fixed bed operation the space velocity, defined as the volume of liquid charged per hour divided by the superficial volume of the packing, ordinarily will be within the range of from about 0.1 to about 10.

The ratio of diluent to ethylene charged to the reaction zone may vary over a relatively broad range, i. e., the ratio is not particularly critical so long as there is sufficient diluent to effect dissolution of the ethylene and the product derived therefrom. A 1:1 ratio ordinarily is satisfactory, but economic and operating costs may dictate the use of higher or lower ratios.

The amount of organic compound containing a (beta-thioethyl) carbonyl group utilized in my process generally will be less than the amount of peroxide employed. Good results have been obtained when one part of the organic compound was present per ten parts of catalyst. Much less may often be used.

The following example is given to illustrate our invention, but it is not introduced with the intention of unduly limiting the generally broad scope of said invention. The experiment was carried out by heating the reactants at 110–115° in a glass liner in a rotating autoclave for 4 hours. The charge consisted of 50 grams of methylcyclohexane, 3 grams of tertiarybutyl perbenzoate, and 0.3 grams of 2,6-dimethyl-2,6-diethylthio-heptanone-4, and ethylene to an initial pressure of 50 atmospheres. Distillation of the diluent from the product yielded 20 g. of residue, which had a wax-like consistency and which melted at 96° C. In an experiment carried out under similar conditions but in the absence of the thioheptanone, the product (24 g.) had a grease-like consistency and melted at 81° C.

We claim as our invention:

1. In the polymerization of ethylene in the presence of an organic peroxide catalyst and a diluent selected from the group consisting of alcohols, aromatic hydrocarbons and saturated hydrocarbons containing at least 3 carbon atoms per molecule, the improvement which comprises adding to the reaction mixture, in sufficient amount to increase the melting point of the ethylene polymer, an organic compound containing a carbonyl group and having a thioethyl group on the carbon atom in beta position to the carbonyl carbon atom, the sulfur atom of said thioethyl group being attached directly to the beta carbon atom, and subjecting the mixture to polymerization under a pressure of from about 15 to about 500 atmospheres and at a temperature at least as high as the decomposition temperature of said catalyst.

2. The improvement of claim 1 further characterized in that said organic compound is a ketone.

3. The improvement of claim 1 further characterized in that said organic compound is a bis(beta-thioethyl) ketone.

4. The improvement of claim 1 further characterized in that said organic compound is a bis(beta-alkylthioethyl) ketone.

5. The improvement of claim 1 further characterized in that said organic compound is a bis(beta,beta-dialkyl-beta alkyl thioethyl) ketone.

6. The improvement of claim 1 further characterized in that said organic compound is a bis(beta,beta-dimethyl-beta-alkylthioethyl) ketone.

7. The improvement of claim 1 further characterized in that said organic compound is bis(beta,beta-dimethyl-beta-ethylthioethyl) ketone.

8. The improvement of claim 1 further characterized in that said organic compound is beta-phenyl-beta-n-propylthioethyl phenyl ketone.

RALPH B. THOMPSON.
LOUIS SCHMERLING.

REFERENCES CITED

The following references are of record in the file of this patent:

UNITED STATES PATENTS

| Number | Name | Date |
|---|---|---|
| 2,395,381 | Squires | Feb. 19, 1946 |
| 2,396,963 | Mortenson | Mar. 19, 1946 |
| 2,405,950 | Hanford | Aug. 20, 1946 |